United States Patent Office 3,586,514
Patented June 22, 1971

3,586,514
THIN-WALLED PLASTIC CONTAINER FOR BEER
Taco Vijlbrief, Rotterdam, Netherlands, assignor to Heineken Technisch Beheer N.V., Amsterdam, Netherlands
No Drawing. Continuation-in-part of application Ser. No. 640,479, May 23, 1967. This application May 28, 1969, Ser. No. 828,697
Claims priority, application Netherlands, May 27, 1966, 6607458
Int. Cl. B65b *3/00;* C08f *45/58*
U.S. Cl. 99—171    3 Claims

ABSTRACT OF THE DISCLOSURE

A thin-walled container for beer and the like, having reduced oxygen permeability, is made of hard polyvinyl chloride which contains an antioxidant.

---

This is a continuation-in-part of my copending application Ser. No. 640,479, now abandoned, filed May 23, 1967.

BACKGROUND OF THE INVENTION

The present invention relates to a thin-walled plastic container, which can be closed. In particular, the invention relates to such containers which are useful for beverages, and specifically for beer.

Beer is now supplied in glass or metal containers. Metal is opaque so that a visual judgement of the contents is impossible. Furthermore, it is difficult to modify a metal contianer in such a way that beer confined therein does not deteriorate in the long run. On the other hand, glass containers have the disadvantage that they are heavy and breakable.

Containers made of transparent plastics would permit visual examination of the contents and at the same time, would be lighter and unbreakable. However, the drawback is that plastics are permeable to oxygen. Some beverages, and beer in particular, are sensitive to oxygen. For example, when a liter of beed of good quality has been bottled, it has to be consumed before it has absorbed about 1 cm.$^3$ of oxygen (standard temperature and pressure or STP) from the surroundings. After the absorption, there is a distinct deterioration of the taste. The problem, therefore, is to fiind a material which can easily be worked up into transparent containers and which will let through very little oxygen.

SUMMARY OF THE INVENTION

According to the present invention, it has been found that a thin-walled container specially suitable for beer and other oxygen-sensitive materials is obtained by having a hard polymer or copolymer of vinyl chloride containing such a quantity of antioxidizing agent that the oxygen permeability of this hard polymer or copolymer, measured as the number of cm.$^3$ of oxygen of standard temperature and pressure which has passed through 1 cm.$^2$ of the plastic through a thickness of 1 mm, per second, per cm. of oxygen overpressure at 20° C. (mercury), amounts to about $10^{-11}$ cm.$^3$ (STP)mm./cm.$^2$, sec., cm. Hg or lower.

By "thin-walled" throughout the specification and claims is understood that the thickness of the wall does not exceed 2.5 millimeters. Thicker walls present working difficulties and moreover, the problem of undesired oxygen permeation through the wall is felt only if the wall is thin.

DESCRIPTION OF INVENTION

If a copolymer of vinyl chloride is used, its vinyl chloride component should amount to at least 75% by weight. Such copolymers are, for instance, those of vinyl chloride with vinylidene chloride or vinyl acetate or vinyl acrylate. The word "hard" is meant to indicate that the plastic contains at least 90% by weight of polymer or copolymer and; it is specially preferred that the plastic contains no plasticizer.

The following consideration gives an idea of the significance of the maximum oxygen permeability of $10^{-11}$ cm.$^3$ (STP)mm./cm.$^2$, sec., cm. Hg. Let it be assumed that a closed container for ½ liter of beer having a surface of 350 cm.$^2$ and a wall-thickness of 1 mm. has been placed in air of atmospheric pressure (which means an oxygen overpressure of about 15 cm. of mercury with respect to the contents of the container). If no more than ½ cm.$^3$ of oxygen (per ½ liter of beer) may pass through the wall of the container, this means a storage time in seconds of $$t = \frac{1}{2 \times 10^{-11} \times 350 \times 15} = 10^7 \text{ sec.} = 4 \text{ months}$$

A value of $10^{-10}$ cm.$^3$ (STP)mm./cm.$^2$, sec., cm. Hg is evidently too high. On the other hand, a value of $10^{-12}$ cm.$^3$ (STP)mm./cm.$^2$ sec., cm. Hg would amount to a permissible storage time of nearly 3½ years, which is unnecessary in practice.

It is surprising that it should be possible to suppress the oxygen permeability of a transparent polymer or copolymer which is suitable for the production of thin-walled containers to such an extent.

The minimum quantity required to reach the effect aimed at depends to some extent on the nature of the antioxidizing agent, but generally speaking from 0.8 to 2%, calculated on the weight of the polymer, will suffice. If, for instance, 1 percent by weight is sufficient, there is little sense in strongly increasing this content up to, for instance, 4%, because from this increase an undesired influence on the mechanical properties of the plasaic is to be expected.

Various antioxidants can be used, among which are: Ionol (2,6 - ditertiarybutyl-4-methylphenol), 2,2'-methylene-bis(4-methyl-6-tertiary butylphenol), dilauryl-thiodipropionate, 2,2'-dihydroxy-3,3' dicyclohexyl-5,5'-dimethyl diphenylmethane, distearylthiodipropionate, 2,4,5 - trihydroxy-butyrophenol and 2,2' - dihydroxy-3,3'-dicyclohexyl-5,5'-dimethyldiphenylmethane.

It is known to use in the making of objects from polyvinyl chloride and the like so-called lubricants. The chemical nature of such lubricants is irrelevant with respect to the present invention. Well-known and prefectly applicable lubricants are glycerol-monoricinoleate and modified paraffines.

Also known is the use of stabilizers such as esters of beta-amino crotonic acid, diphenylthiourea, calcium stearate and zinc stearate and mixtures of such stearates and epoxy resins. The chemical nature of such stabilizers is irrelevant with respect to the present invention.

The type of the hard polyvinyl chloride compound is simply dictated by its ability to be formed into containers if necessary with the aid of stabilizers or lubricants or both. A so-called "suspension-PVC" is suitable and for practical purposes a limited range of K-values is to be preferred. For instance a K-value between about 58 and about 60 as measured in 1,2-dichloro ethane. A very suitable hard copolymer can be obtained by copolymerization of 20–30 parts by weight of vinylidene chloride and of 70–80 parts by weight of vinyl chloride. In the next examples the polyvinyl chloride compound was "Solvic-229."

A hard polyvinyl chloride without antioxidizing agent had an oxygen permeability of $3 \times 10^{-11}$ cm.$^3$ (STP)mm./cm.$^2$, sec., cm. Hg. On the addition thereto of 0.8% by weight of 2,2'-methylene-bis-(4-methyl-6-tertiarybutyl-phenol) in the mass, the oxygen permeability was found to be 5 to 8 times $10^{-12}$ cm.$^3$ (STP)mm./cm.$^2$, sec., cm., Hg.

Another type of hard polyvinyl chloride, without antioxidant, showed an oxygen permeability of $3 \times 10^{-11}$ cm.$^3$ (STP)mm./cm.$^2$, sec., cm. Hg whereas with 1% by weight of 2,2'-dihydroxy-3,3'-dicyclohexyl-5,5'-dimethyl diphenylmethane and with 2% of the same antioxidant respectively, the oxygen permeability was substantially lower, viz 6.5 and 1.5 times $10^{-12}$ cm.$^3$ (STP)mm./cm.$^2$, sec., cm. Hg respectively.

The measurement of the oxygen permeability used in determining the values expressed in this application has been standardized according to H. J. Huldy, Plastica 15, 210 (1962); the temperature was 20° C.

Measurements of various hard polymers or copolymers of vinyl chloride and various antioxidizing agents have invariably shown that when about 0.8–2% by weight of antioxidizing agent was used, the oxygen permeability of the plastic container wall made therefrom was at least five to ten times smaller than without antioxidizing agent.

The wall-thickness of the containers according to the examples was about 0.8 millimeter. The containers had a mainly cylindrical shape with shoulder region leading to the filling opening. The bruto content was 420 cm.$^3$ and the netto content was 380 cm.$^3$ The weight was about 50 grams. In other words, the containers each had an internal volume of 420 cubic centimeters, and contained 380 cubic centimeters of beer. The weight of the empty bottle was about 50 grams.

Pigments or coloring substances may also be present in the polymer or hard polymer.

The result is that a thin-walled container is provided which can be closed, according to the present invention, and in which oxygen-sensitive beverages, and particularly beer, can be stored for a long time.

Now that insight has been obtained into the connection between the oxygen permeability in relation to beer and the like and the presence of an antioxidizing agent, it is a simple matter for the expert to ascertain what is the most effective quantity of a specific antioxidizing agent for a specific composition of hard polyvinyl chloride or a hard copolymer on basis of polyvinyl chloride.

Although from a chemical and mechanical point of view the chemical nature of the lubricants, the antioxidants, the stabilizers and the like is not important as long as such compounds act as lubricants, antioxidants, stabilizers, pigments, coloring substances and the like in the usual way, the mere fact that the thin-walled containers according to the invention may be used for the storage of beverages such as beer imposes a restriction on the choice of such chemical compounds since the container should meet the requirements for public health.

I claim:

1. A thin-walled plastic container with beer or other oxygen-sensitive beverage packaged therein, said container having a wall thickness not exceeding 2.5 millimeters and fabricated of a material selected from the group consisting of hard homopolymers of vinyl chloride and hard copolymers of vinyl chloride with vinylidene chloride, vinyl acetate or vinyl acrylate in which the vinyl chloride content is at least 75% by weight, the material containing at least 0.8% by weight of antioxidant consisting essentially of an antioxidant of the group consisting of 2,6-ditertiary-butyl-4-methylphenol, 2,2'-methylene-bis(4-methyl-6-tertiary butylphenol), dilaurylthiodipropionate, distearylthiodipropionate, 2,4,5-trihydroxy-butyrophenol and 2,2'-dihydroxy-3,3'-dicyclohexyl-5,5' - dimethyldiphenylmethane, the oxygen permeability of the hard polymer or copolymer, measured as the number of cm.$^3$ of oxygen at standard temperature and pressure which passes through 1 cm.$^2$ of the plastic through a thickness of 1 mm., per second, per cm. of oxygen overpressure (mercury), being about $10^{-11}$ cm.$^3$ (STP)mm./cm.$^2$, sec., cm. Hg or lower.

2. A thin-walled plastic container according to claim 1, wherein the plastic comprises at least about 90% by weight of a material selected from the group consisting of polyvinyl chloride and a copolymer thereof with vinylidene chloride, vinyl acetate or vinyl acrylate in which the vinyl chloride content is at least 75% by weight, and about 0.8–2% by weight of antioxidizing agent.

3. A thin-walled plastic container according to claim 1 in which the amount of antioxidizing agent is about 1–2% by weight of the material.

References Cited

UNITED STATES PATENTS

| | | | |
|---|---|---|---|
| 2,688,995 | 9/1954 | Wagoner | 215—1.5UX |
| 3,092,275 | 6/1963 | Bronton | 215—1UX |
| 3,282,729 | 11/1966 | Richardson | 215—1.5X |
| 3,346,536 | 10/1967 | Kauder | 260—45.85 |
| 3,392,032 | 7/1968 | Lines | 99—171 |
| 3,425,987 | 2/1969 | Oswald | 260—45.95 |

FRANK W. LUTTER, Primary Examiner

R. HALPER, Assistant Examiner

U.S. Cl. X.R.

215—1; 260—45.95